United States Patent [19]
Wahl et al.

[11] Patent Number: 5,498,018
[45] Date of Patent: Mar. 12, 1996

[54] WHEEL SUSPENSION

[75] Inventors: George Wahl, Pforzheim; Matthias Dietz, Bietigheim-Bissingen; Norbert Schote, Ammerbuch; Robert Klosterhuber, Stuttgart; Karl Sommerer, Wiernsheim; Reinhard Kunert, Weissach, all of Germany

[73] Assignee: Dr. Ing. h.c.F. Porsche AG, Weissach, Germany

[21] Appl. No.: 350,040

[22] Filed: Nov. 29, 1994

[30] Foreign Application Priority Data

Nov. 29, 1993 [DE] Germany .......................... 43 40 557.6

[51] Int. Cl.$^6$ ................................................... B62D 7/16
[52] U.S. Cl. ........................... 280/673; 280/661; 280/691
[58] Field of Search .................................. 280/661, 95.1, 280/673, 668, 675, 688, 671, 691, 716, 690, 660

[56] References Cited

U.S. PATENT DOCUMENTS

| | | | |
|---|---|---|---|
| 4,738,458 | 4/1988 | Warner | 280/675 |
| 5,000,477 | 3/1991 | Minakawa et al. | 280/690 |

FOREIGN PATENT DOCUMENTS

| | | |
|---|---|---|
| 0271879A2 | 6/1988 | European Pat. Off. . |
| 2645800 | 10/1990 | France . |
| 2255679 | 5/1974 | Germany ............................... 280/691 |
| 3200855A1 | 7/1983 | Germany . |

(List continued on next page.)

OTHER PUBLICATIONS

European Search Report, Germany, Mar. 1995.
JP58185308, Patent Abstracts of Japan, published Oct. 29, 1983 "Trailing Arm Type Suspension with Lateral Link".
JP2208167, Patent Abstracts of Japan, published Aug. 17, 1990, "Camber Regulating Device for Wheel Suspension Device for Automobile".
91-207990, from European Patent Office, WO9108918, Data Search of Derwent.
J. Reimpell "Fahrwerktechnik: Lenkung" 1984. pp. 232, 233.
Revue Technique Automobile, Bd. 45, May 1990, No. 515, Boulogne, Billancourt Fr.
ATZ Automobiletechnische Zeitschrift, Bd. 95, Nr. 11. Nov. 1993, "Das Fahrwerk des Neuen Porsche 911 Carrera".
Automobiltechnise Zeitschrift, Bd. 79, Nr. 9, Sep. 1977, pp. 357–365, W. Matschinsky et al. 'Die Die Doppelgelenk--Federbeinachse derneuen, BMW—Sechszylinderwagen der Baureihe 7'.

*Primary Examiner*—Margaret A. Focarino
*Assistant Examiner*—Paul N. Dickson
*Attorney, Agent, or Firm*—Evenson McKeown Edwards & Lenahan

[57] ABSTRACT

A wheel suspension for an axle of a motor vehicle, particularly a McPherson front axle, has a transverse control arm and a pivotally connected tension strut, the transverse control arm being held on the wheel carrier by way of a joint, and the body-side bearings of the transverse control arm and of the tension strut as well as of the connection bearing between the transverse control arm and the tension strut being constructed with a defined characteristic for the elastokinematic adjustment of the wheel under the effect of peripheral forces acting upon the wheel. The transverse control arm with the connected tension strut is arranged in an approximately horizontal plane and extends below the wheel spin axis approximately in a wheel center transverse plane. The tension strut is pivotally connected to the transverse control arm by way of a connection bearing and extends at an angle diagonally with respect to a longitudinal center axis of the vehicle. The transverse control arm is arranged, in each case, at a distance in the perpendicular and longitudinal direction with respect to a tie rod of a steering gear arranged below the wheel spin axis and—with respect to the driving direction—in front of the transverse control arm.

21 Claims, 10 Drawing Sheets

FOREIGN PATENT DOCUMENTS

| | | | |
|---|---|---|---|
| 3331282 | 3/1985 | Germany | 280/673 |
| 3616005C2 | 11/1986 | Germany . | |
| 3926665A1 | 2/1990 | Germany . | |
| 3939312A1 | 5/1990 | Germany . | |
| 3843613A1 | 7/1990 | Germany . | |
| 3197215 | 8/1991 | Japan | 280/691 |
| 1007999 | 10/1965 | United Kingdom | 280/691 |

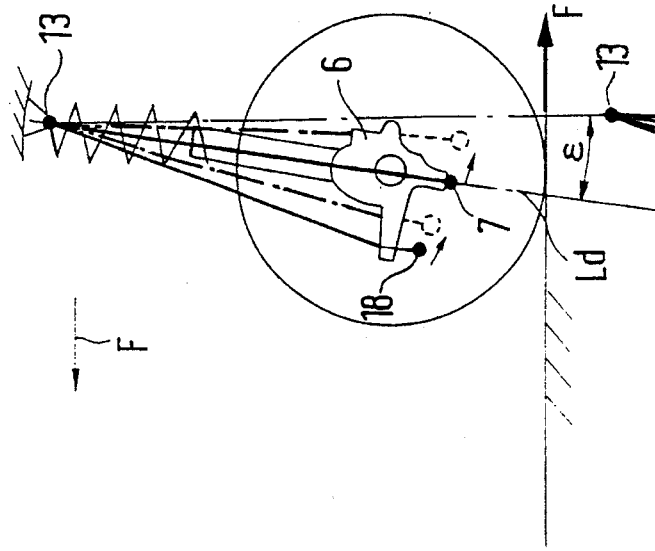
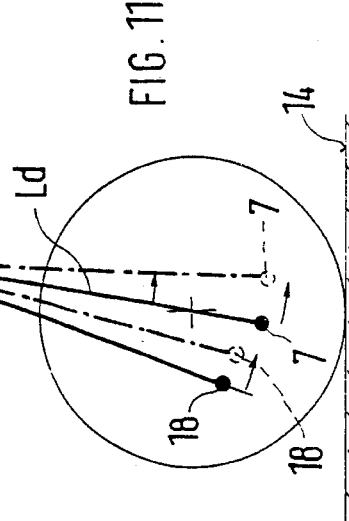
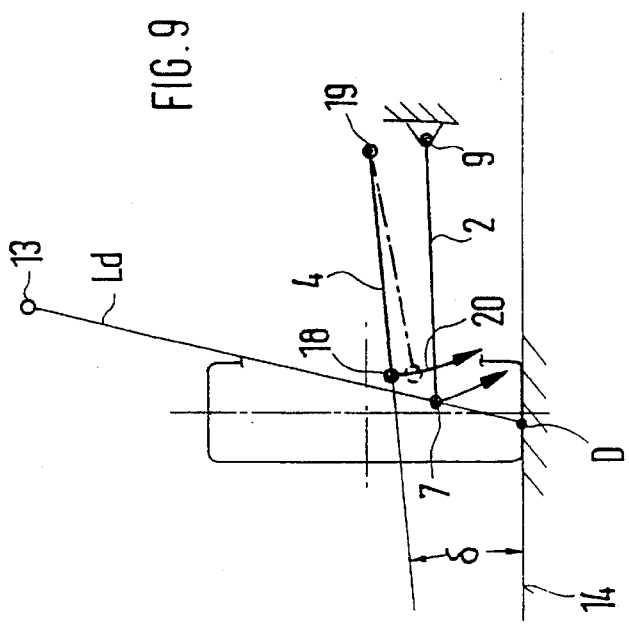

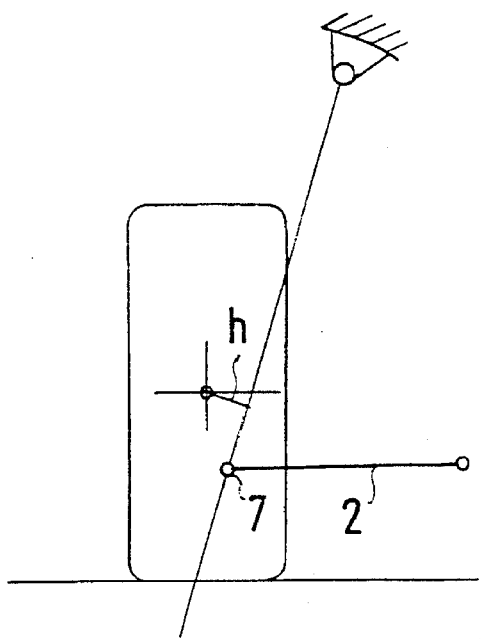
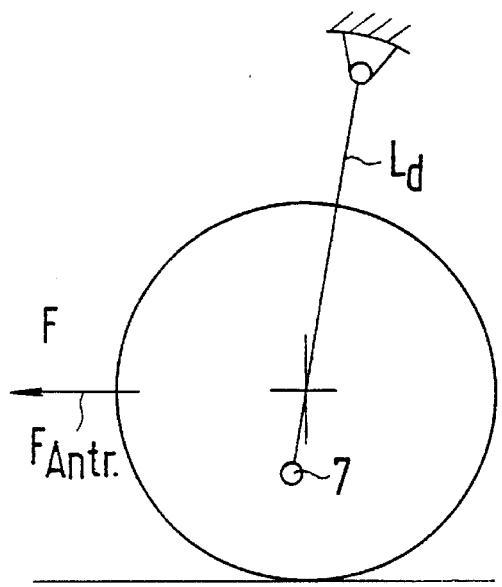
FIG. 13  FIG. 14
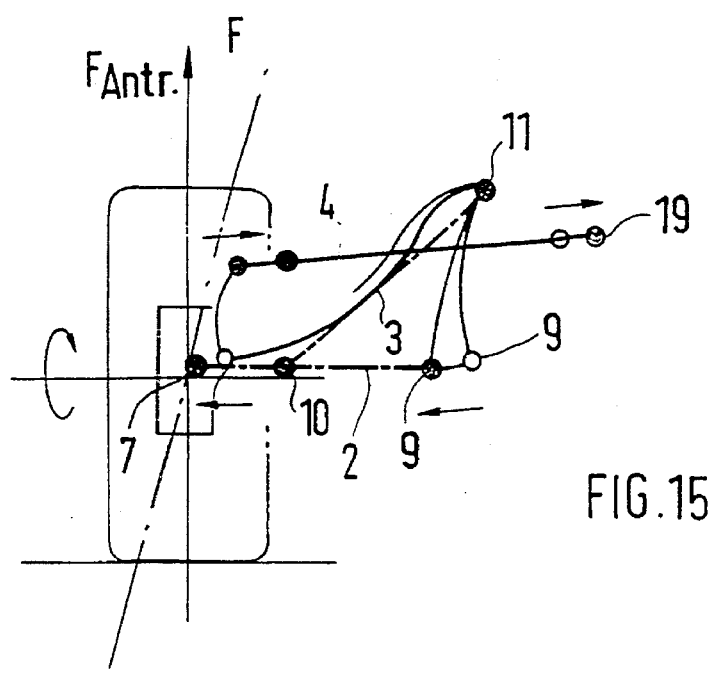
FIG. 15

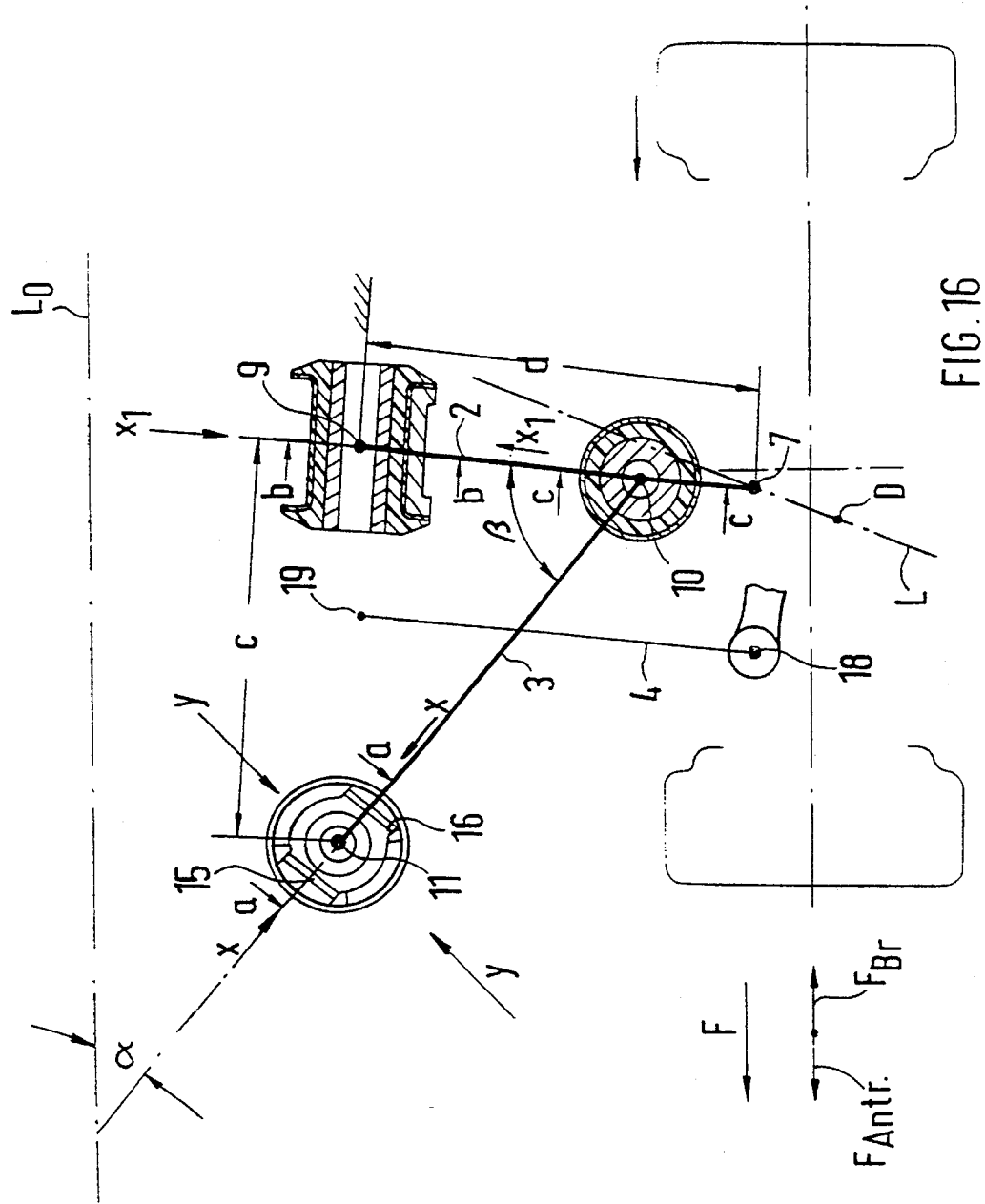
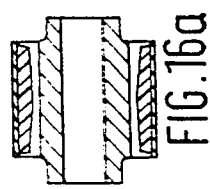
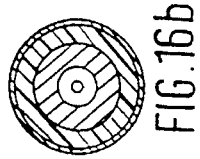
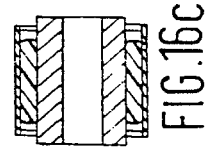

WHEEL SUSPENSION

BACKGROUND AND SUMMARY OF THE INVENTION

This invention relates to a wheel suspension for an axle of a motor vehicle, particular for a McPherson front axle.

A wheel suspension is known from German Patent Document DE 36 16 005 C2 in which a lower transverse control arm is swivellably connected by means of its one end to the vehicle frame and is swivellably connected by means of its other end with a steering knuckle. A strut which extends approximately in the longitudinal direction is rigidly connected with the transverse control arm, the free end of the strut being elastically supported on the vehicle body.

Furthermore, a wheel suspension is known from German Patent Document DE 32 00 855 A1 in which a strut is connected in an articulated manner with a transverse control arm.

It is an object of the invention to provide a wheel suspension for an axle of a motor vehicle comprising a McPherson strut which, when peripheral forces act upon the wheel, ensures a targeted elastokinematic wheel position change which assures advantageous influences on the vehicle handling characteristics during cornering and straight-ahead driving.

According to the invention, this object is achieved by means of a wheel suspension for a motor vehicle comprising:
- a wheel carrier for carrying a wheel rotatable about a wheel spin axis,
- a McPherson spring strut springingly supporting the wheel carrier at a vehicle body,
- a steering gear tie rod extending below the wheel spin axis and connected to the wheel carrier,
- a transverse control arm connected to the wheel carrier by a first joint connection and connected to a vehicle frame part by a second joint connection, and
- a tension strut connected pivotably to the transverse control arm by a third joint connection and to a vehicle frame part by a fourth joint connection.

wherein the transverse control arm with the connected tension strut is arranged in an approximately horizontal plane and extends below the wheel spin axis approximately in a wheel center transverse plane, the tension strut extending at an angle diagonally with respect to a vehicle longitudinal center axis, and wherein the transverse control arm is spaced a distance in each of the perpendicular and longitudinal direction of the vehicle with respect to the tie rod and is disposed behind the tie rod with respect to the vehicle driving direction.

Principal advantages achieved by means of the invention are that the wheel suspension, as a result of the positioning of the transverse control arm with the tension strut with respect to the tie rod of the steering gear and of the positioning of the McPherson strut with respect to the transverse control arm, a targeted elastokinematic wheel position change is achieved while forces act upon the wheel, whereby the vehicle handling can be advantageously influenced in the case of braking and driving forces as well as in the case of a longitudinal springing. It is advantageous that, as a result of the wheel suspension according to the invention, the wheel is adjusted in the toe-out direction during braking in a curve.

Thus, the transverse control arm together with the connection tension strut is arranged in an approximately horizontal plane, the transverse control arm extending below the wheel spin axis approximately in a wheel center transverse plane. The tension strut is connected with the transverse control arm by way of an elastic bearing, this tension strut being arranged at an angle diagonally with respect to a longitudinal center axis of the vehicle. In the perpendicular and longitudinal direction, the transverse control arm is disposed at a distance from the tie rod.

In order to achieve an excursion of the transverse control arm, this transverse control arm and the tension strut are each pivotally connected by way of an elastic bearing held on a subframe. The bearing of the tension strut has radial recesses which are arranged in the axial direction of the tension strut. As a result, in the loading direction, which corresponds to the axial direction of the tension strut, a soft characteristic of the bearing is achieved. The elastic bearing of the tension strut with the radial recesses may also be arranged in the transverse control arm. In contrast, the body-side bearing of the transverse control arm is constructed to be radially stiffer, on the whole.

For achieving approximately identical lever conditions on the wheel suspension, the distance between the two body-side bearings of the transverse control arm and of the tension strut are constructed corresponding to the length of the transverse control arm between its two bearings. The connection bearing between the tension strut and the transverse control arm permits a movement and, in the radial direction, has a softer characteristic than the bearing of the transverse control arm. For the connection with the connection bearing on the transverse control arm, the tension strut has a fork head which reaches over the bearing from both sides.

The body-side bearing of the tension strut with its radial recesses essentially contributes to achieving a longitudinal springing. In the case of the longitudinal springing, the wheel can move toward the rear and toward the front—with respect to the driving direction—about an imaginary correcting pole. This pole is formed by the setting of the transverse control arm with respect to the tie rod—in the top view. The pole is situated on the interior side of the wheel whereby the wheel can adjust in the toe-out direction during a movement toward the rear. In the case of a longitudinal springing toward the front, the wheel moves into the toe-in direction. A body-side bearing is used as a pivot for the transverse control arm.

A steering axis is formed between the body-side bearing point of the McPherson strut and the bearing point of the transverse control arm on the wheel carrier. This steering axis has a point of intersection in the wheel contact plane and outside the track gauge. The point of intersection of this steering axis is arranged in front of the wheel center transverse plane—with respect to the driving direction—and crosses the wheel spin axis on the interior side of the wheel. As a result of the position of the steering axis with respect to the perpendicular wheel center longitudinal plane, a lever arm is formed at the level of the wheel spin axis. In the case of driving forces, this position of the steering axis causes a moment in the wheel center, whereby the tie rod is stressed by pressure and the transverse control arm is stressed by tension. Corresponding to the defined elasticity of the body-side elastic bearing of the transverse control arm in the radial directions, in the case of driving forces, the wheel is therefore adjusted in the toe-in direction.

When braking forces act upon the wheel, a wheel position change is achieved in the toe-in direction, for the purpose of which, on the one hand, the steering axis has a negative steering offset and, on the other hand, the tie rod—viewed from the rear—extends from the pivotal connecting point on the steering gear to the wheel-carried-side bearing sloped at an angle toward the road and it has a shorter construction with respect to the transverse control arm. This causes a wheel position change in the toe-in direction when the caster angle of the steering axis is reduced under the effect of braking forces.

The position of the steering axis is designed such with respect to the wheel that a larger lever arm is created in the wheel center than in the wheel contact surface so that, in connection with the bearings of a defined elasticity on the subframe or on the vehicle body, the wheel position change in the toe-in direction as a result of the driving forces of a wheel position change in the toe-in direction can be superimposed, in addition, by a longitudinal springing. So that the toe-in change is kept within limits, the body-side bearing on the tension strut is provided which such a characteristic curve that the longitudinal springing toward the front in the driving direction remains low. This improves the straight running of the vehicle.

The caster angle of the steering axis can be changed corresponding to the use of a power steering system or a manual steering system. For this purpose, the upper bearing point of the spring strut is adjusted in the driving direction so that, in the case of power steering, a larger caster angle can be adjusted and, in the case of manual steering, a smaller caster angle can be adjusted.

So that the holding of the bearing is simplified and the costs of the wheel suspension on the vehicle are minimized, the transverse control arms, the wheel carriers and the bearing as well as the tension struts for the front axle as well as for the rear axle of a vehicle have the same dimensions.

Other objects, advantages and novel features of the present invention will become apparent from the following detailed description of the invention when considered in conjunction with the accompanying drawings.

BRIEF DESCRIPTION OF THE DRAWINGS

FIG. 9 is a frontal view of the wheel suspension in which the position of the tie rod under the influence of braking forces is indicated by interrupted lines;

FIG. 10 is a lateral schematic view of the wheel suspension corresponding to FIG. 9 showing the caster angle adjustment;

FIG. 11 is a lateral schematic view similar to FIG. 10, without showing the wheel carrier;

FIG. 13 is a frontal view of the wheel suspension with an illustrated lever arm between the perpendicular wheel center longitudinal plane and the steering axis in the wheel center;

FIG. 14 is a lateral view of FIG. 13;

FIG. 15 is a top view of the wheel suspension in which the position of the wheel suspension during the influence of driving forces on the wheel is indicated by interrupted lines;

FIG. 16 is a top view of a schematic wheel suspension, with a top view and a lateral view of the elastic bearings;

FIG. 16a' is a sectional view similar to FIG. 16a, showing a modified embodiment of the bearing;

FIG. 16b is a sectional view of the bearing according to Line b—b of FIG. 16;

FIG. 16c is a sectional view of the bearing according to Line c—c of FIG. 16.

DETAILED DESCRIPTION OF THE DRAWINGS

Figure 1:
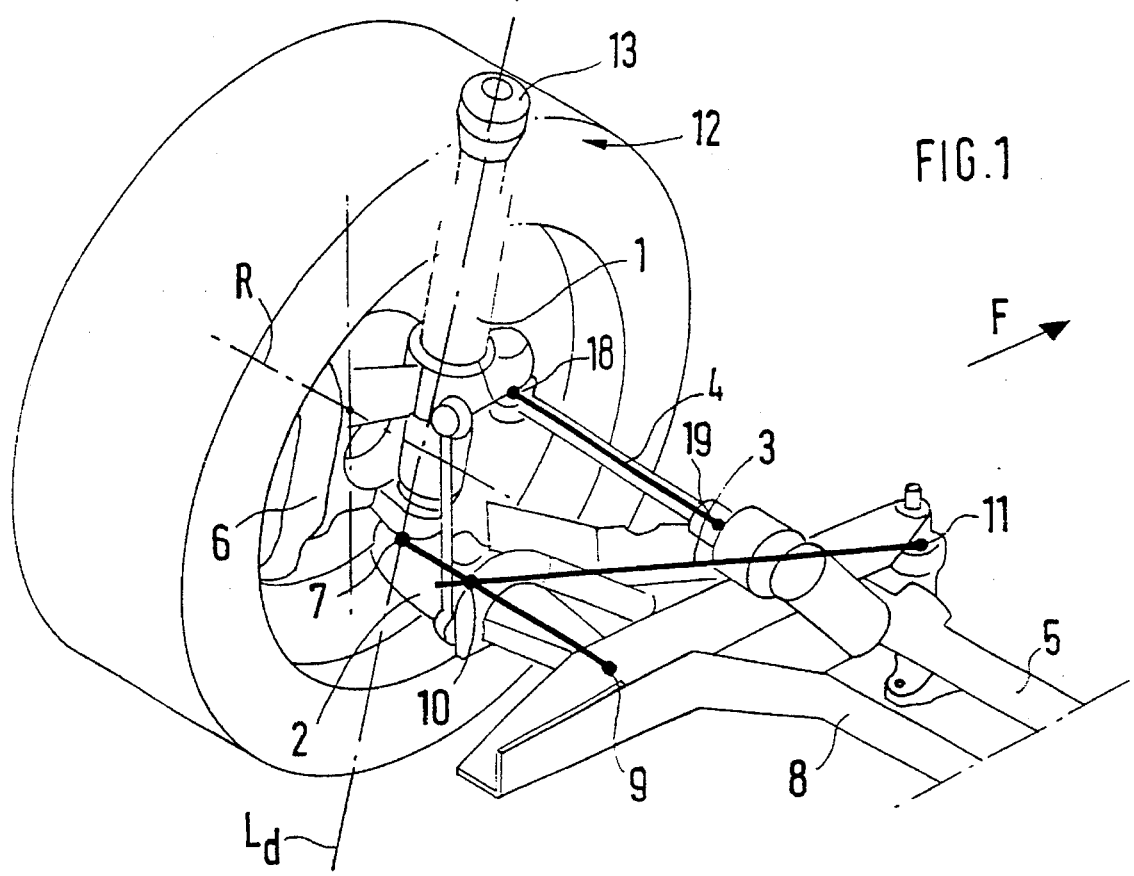
FIG. 1 is a diagrammatic representation of a wheel suspension of a front axle constructed according to a preferred embodiment by the present invention.

The wheel suspension for a front or rear axle comprises a transverse control arm 2 with a diagonally set tension strut 3 as well as a McPherson spring strut 1 and a tie rod 4 of a steering gear 5.

The transverse control arm 2 is supported on the wheel carrier 6 by way of a ball joint 7 and is pivotally connected on the vehicle body by means of a subframe 8 or an auxiliary frame in an elastic bearing 9. On the transverse control arm 2, the tension strut 3 is held in an elastic bearing 10, which tension strut 3 is fastened to the subframe 8 in another elastic bearing 11.

Figure 4:
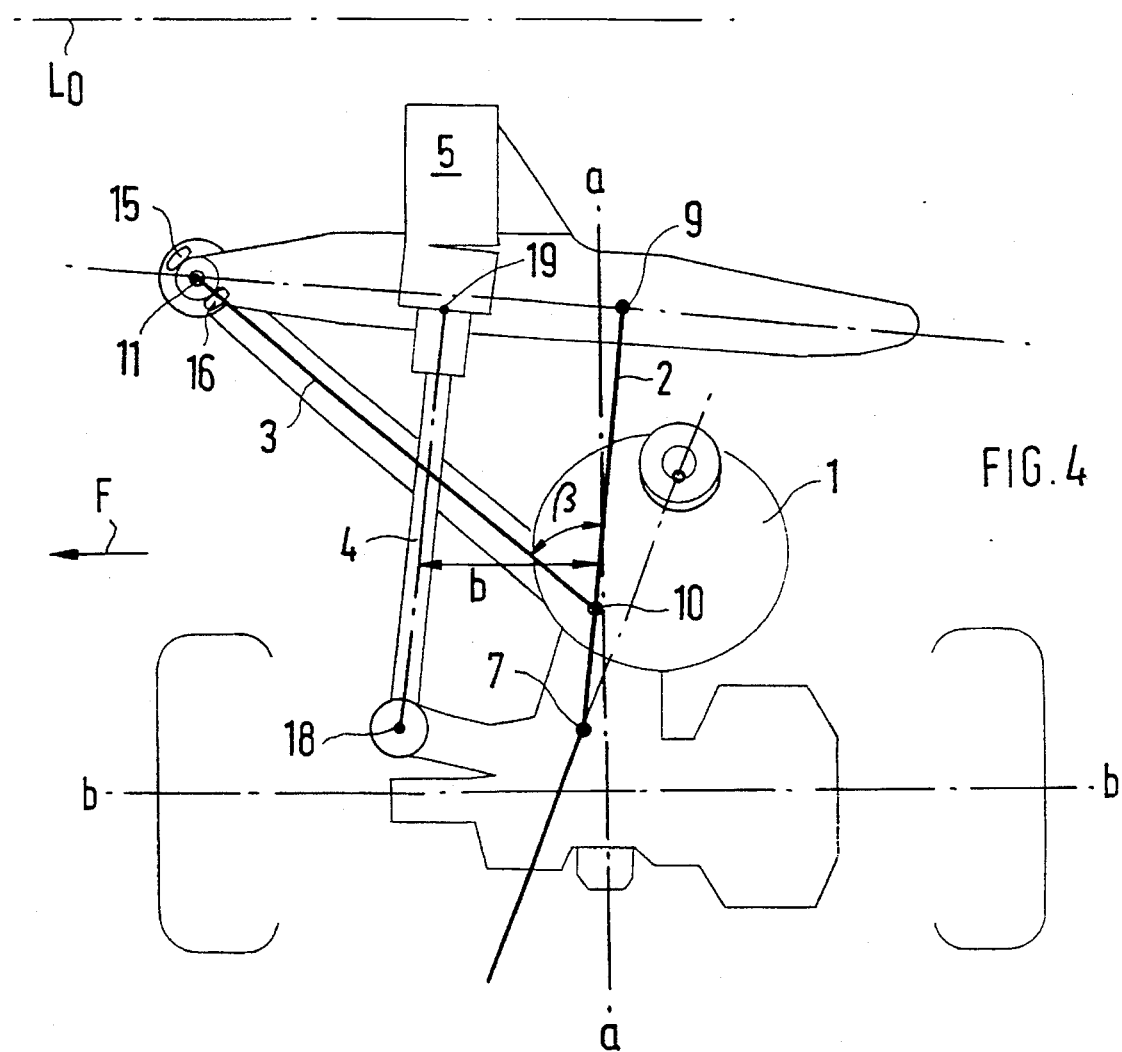
FIG. 4 is a top view of the wheel suspension according to FIGS. 2 and 3.
Figure 5:
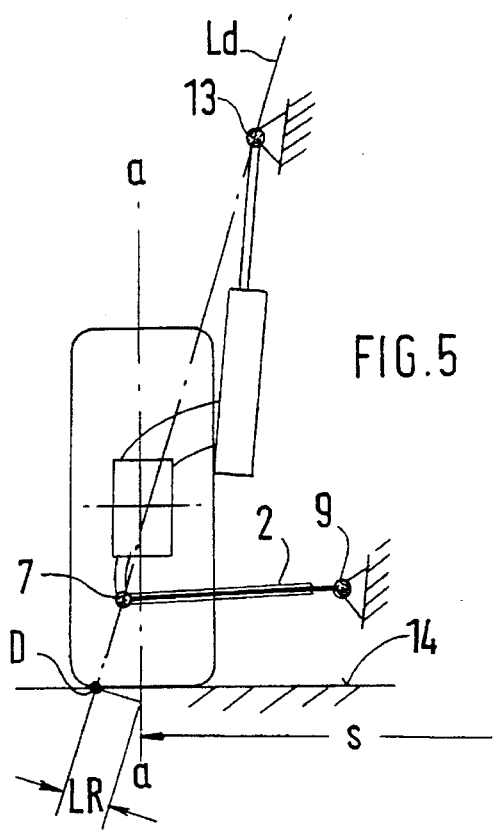
FIG. 5 is a frontal schematic view depicting a steering axis at the front axle for the wheel suspension of FIGS. 1–4.
Figure 6:
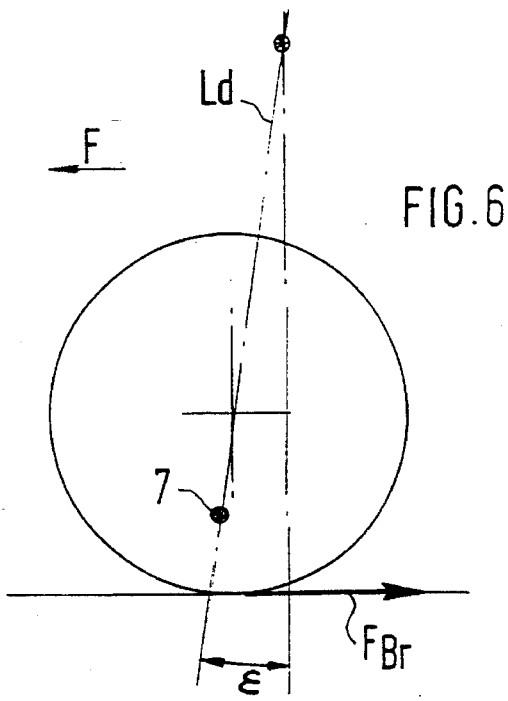
FIG. 6 is a lateral schematic view depicting a steering axis at the front axle for the wheel suspension of FIGS. 1–4.
Figure 7:
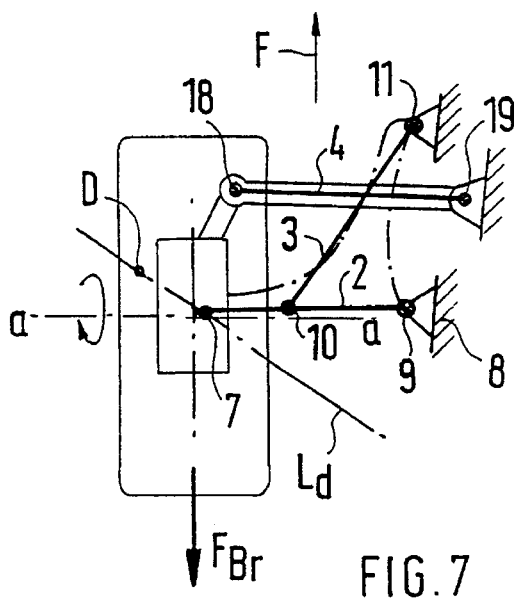
FIG. 7 is a top view of the wheel suspension with the illustrated steering axis in the inoperative condition.
Figure 8:
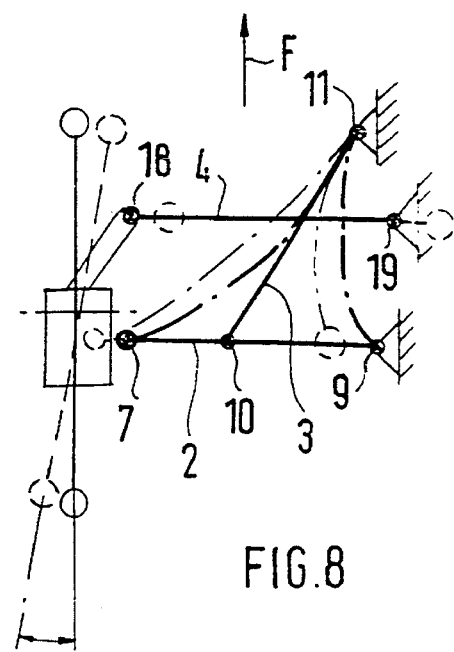
FIG. 8 is a top view according to FIG. 6 in which the position of the control arms under the influence of braking forces is indicated by interrupted lines.

The transverse control arm 2 and the tension strut 3 are arranged in an approximately horizontal plane x—x below the wheel spin axis R. The tension strut 3 extends at an acute angle β (FIG. 4) to the transverse control arm 2 against the driving direction F, in which case the transverse control arm 2 extends approximately in a wheel center transverse plane a—a. With respect to the driving direction F, the tie rod 4 is arranged in front of the transverse control arm 2 directly below the wheel spin axis R and has a distance a to the lower-situated transverse control arm 2 which—with respect to the driving direction F—is disposed at a lateral distance b—behind the tie rod 4.

The elastic bearings 9, 10 and 11 of the suspension are provided with such a defined elastic characteristic that, when forces act upon the wheel, such as driving and braking forces as well as longitudinal impacts, a wheel position change is achieved which influences the vehicle handling in an advantageous manner.

The length d of the transverse control arm 2 corresponds approximately to the distance c between the two body-side bearings 9 and 11 (FIG. 16), in which case the bearing 10 of the tension strut 3 in the transverse control arm 2 is arranged closer to the joint 7 on the wheel carrier 6 than the bearing 9 on the subframe 8.

By means of its one upper end 12, the McPherson spring strut 1 is supported in a bearing 13 on the vehicle body. Its lower end is held on the wheel carrier 6. A connecting line between the upper bearing 13 and the joint 7 results in a steering axis Ld. This steering axis has a point of intersection D in the wheel contact plane 14 outside the track width s and—with respect to the driving direction F—in front of the wheel center transverse plane a—a. Steering axis Ld crosses the wheel spin axis R on the interior side of the wheel and has a distance (lever arm h) with respect to the wheel center longitudinal plane b—b. The steering axis Ld has such a setting that a caster angle ε is obtained.

The tension strut 3 is held on the subframe 8 in an upright bush bearing 11 which has radial recesses 15, 16 in its main loading directions x in the longitudinal direction of the strut 3 and, as a result, has a softer construction in these directions than in the longitudinal and perpendicular direction of the vehicle. The horizontally situated body-side bush bearing 9 of the transverse control arm 2 has the same elasticity in all directions and, on the whole, has a radially stiffer construction than the bearing 11 of the tension strut.

The connection bearing 10 between the tension strut 3 and the transverse control arm 2 is constructed as an upright bush bearing and permits a cardanic movement of the tension strut 3 with respect to the transverse control arm and has a softer construction in the radial direction than the bearing 9. At the end which is to be connected with the bearing 10, the tension strut 3 has a fork 17 with two legs 18, 19 which reach from above and below over the upright bush bearing 10.

For the wheel position change in the toe-in direction or for the toe-in change under the effect of braking forces, driving forces or for the longitudinal springing, the tension strut 3 and the transverse control arm 2 as well as the tie rod 4 can be correspondingly swivelled via their bearings 10, 11 and 7, 9 and 18.

Figure 2:
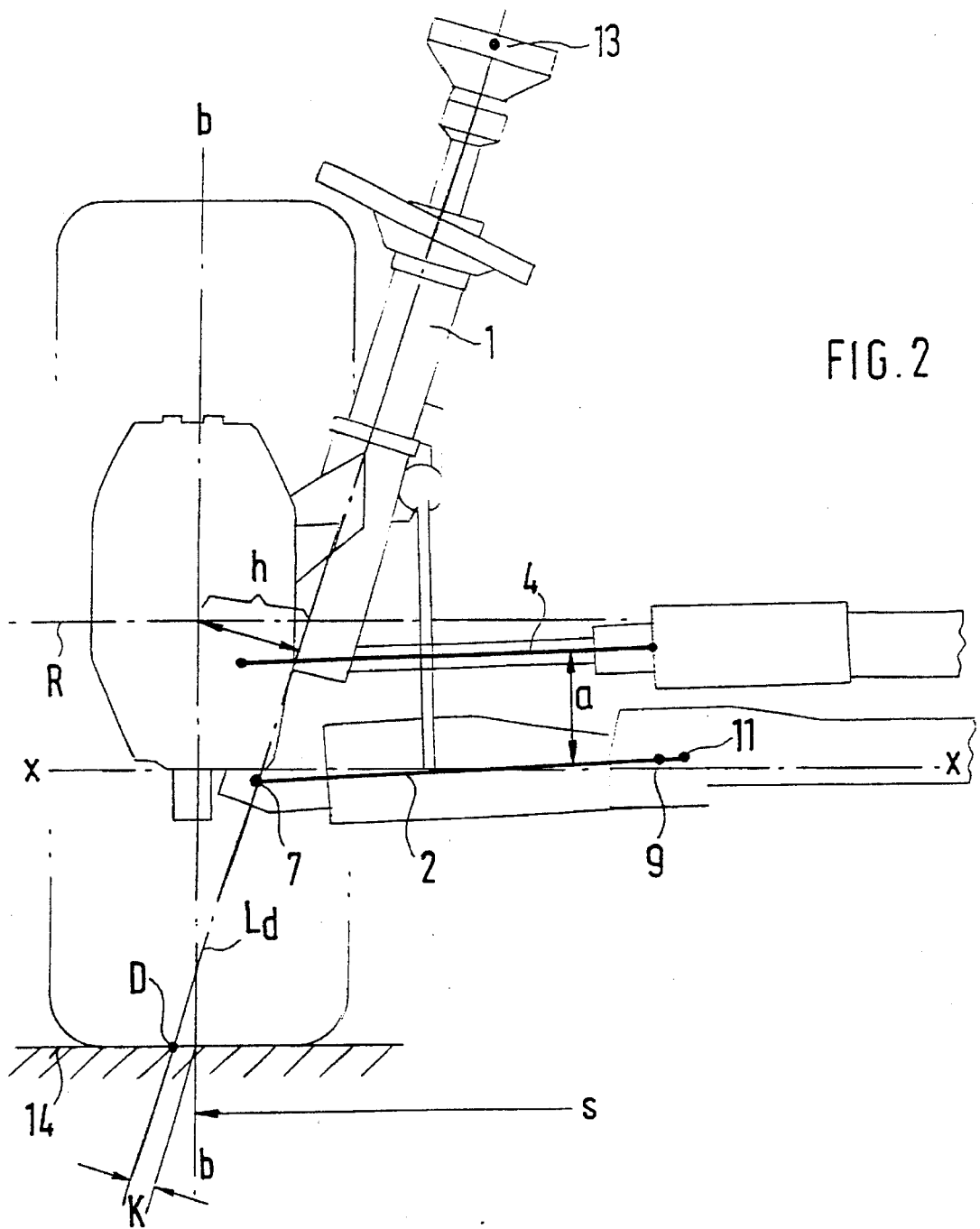
FIG. 2 is a frontal view of the wheel suspension of the front axle according to FIG. 1.
Figure 3:
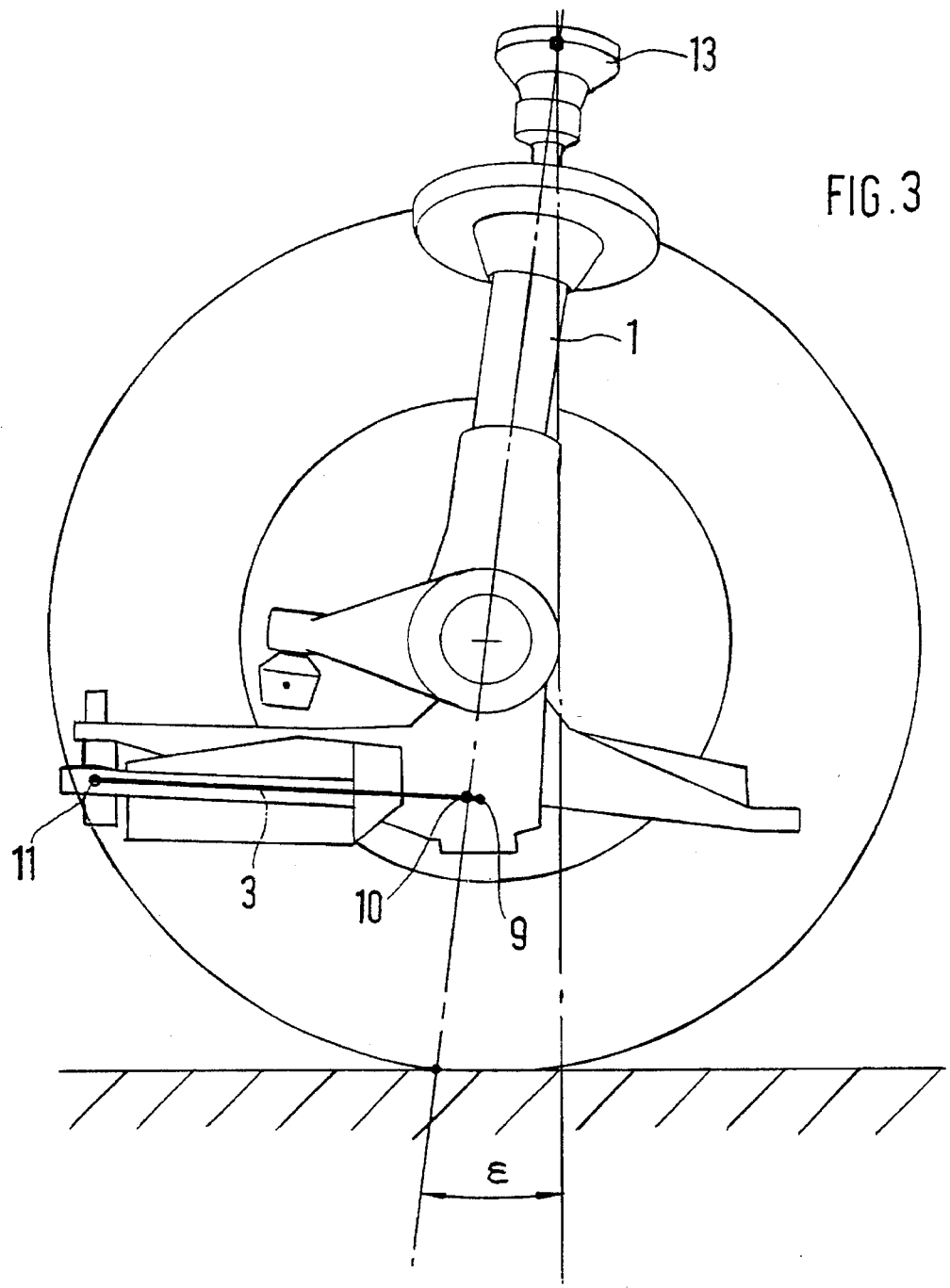
FIG. 3 is a lateral view of the wheel suspension according to FIG. 2.

Thus, for the purpose of a wheel position change in the toe-in direction, in the case of brake forces $F_{Br}$, the tie rod—viewed from the rear—is set, from the pivotal connecting point 19 on the steering gear 5 to the bearing 18 on the wheel carrier 6, at an angle δ with respect to the wheel contact plane 14 (FIG. 9). Since the tie rod 4 has a shorter construction than the transverse control arm 2, the bearing point 18 of the tie rod 4, in the case of braking forces $F_{Br}$ will move in the direction of the arrow 20 by a swivelling of the wheel carrier 6 and a resulting reduction of the caster angle ε (FIG. 10). This caster angle reduction has the result that the joint 18 of the tie rod 4 moves more in the downward direction than the joint 7. In addition, the diagonal position of the tie rod 4 at the angle δ (FIG. 9) has the result that the joint 18 moves toward the interior and thus the wheel is adjusted into the toe-in direction. In addition, as a result of the lever arm k (FIG. 2) (steering offset) formed in the wheel contact surface 14, a moment of $F_{Br} \times k$ will be formed between the steering axis Ld and the perpendicular wheel center longitudinal plane a—a. In this case, the tie rod 4 is stressed with respect to pressure, and the transverse control arm 2 is stressed with respect to tension, whereby a toe-in adjustment of the wheel is set.

In the case of driving forces $F_{Antr}$, as a result of the lever arm h formed by the steering axis Ld, a moment $F_{Antr} \times h$ acts upon the wheel, whereby a toe-in adjustment is achieved. In this case, the tie rod 4 is stressed with respect to tension and the transverse control arm 2 is stressed with respect to pressure, which is shown in detail in FIG. 15.

Figure 12:
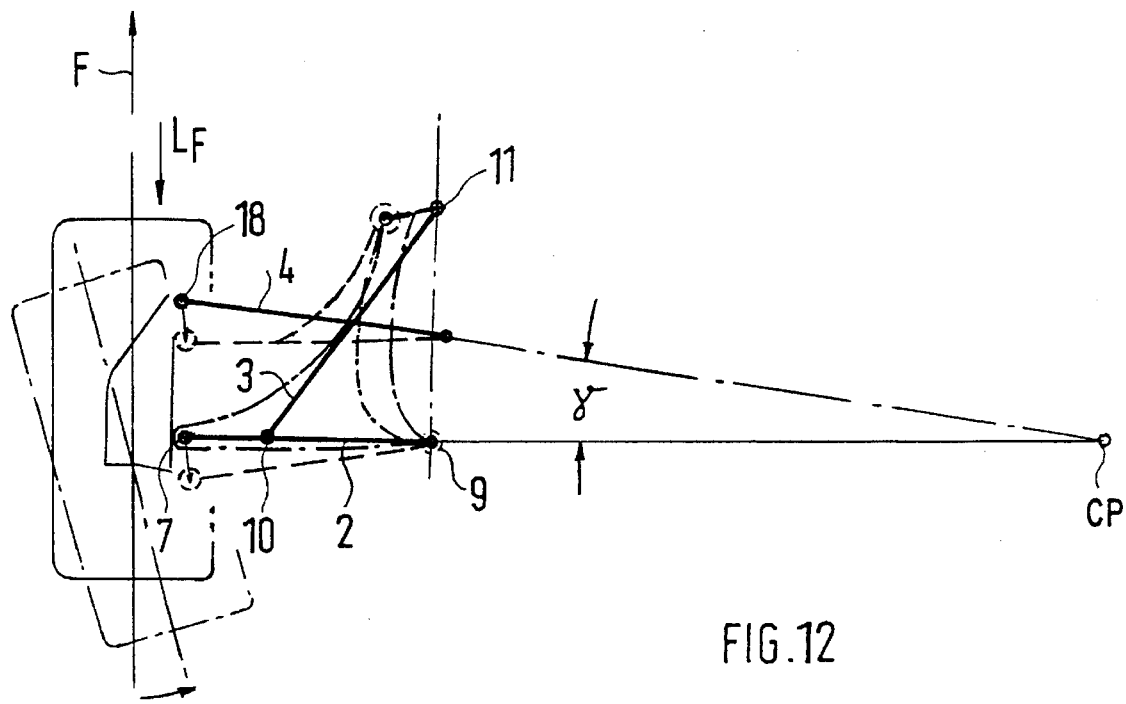
FIG. 12 is a top view of the wheel suspension with the illustrated correcting pole during longitudinal springing.

When the bearing 11, which has a radially soft construction, yields under the driving force, the wheel springs forward in the driving direction F and in the process rotates about a correcting pole CP. This pole CP is situated on the interior side of the wheel and is formed by the intersecting point of the direction (directions of the dimension) of the transverse control arm 2 and the tie rod 4. These directions run together toward the interior at an angle γ FIG. 12). Because of its harder radial characteristic, the bearing 9 forms a center of motion for the transverse control arm so that the wheel can carry out an adjustment in the toe-in direction. As a result of this adjustment of the wheel during a longitudinal springing in the toe-in direction, the toe-in of the wheel is superimposed by driving forces. So that this toe-in amount is limited, the bearing 11 is limited corresponding to its movement toward the front.

Figure 16A:
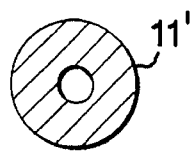
FIG. 16a is a sectional view of the bearing according to Line a—a of FIG. 16.
Figure 17:
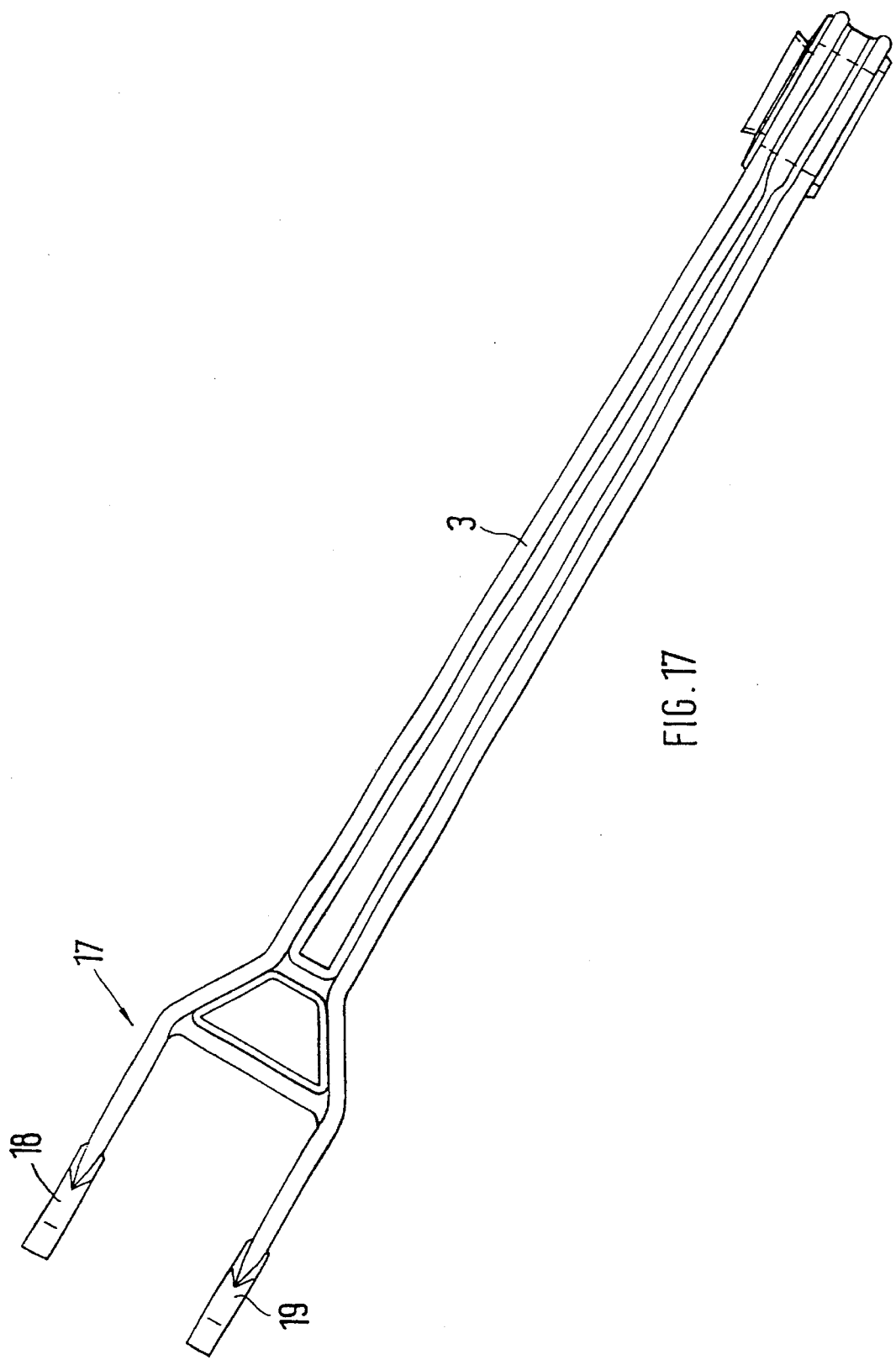
FIG. 17 is a lateral view of a tension strut.

In another contemplated embodiment shown schematically in FIG. 16a', the bearing 11' is constructed as a ball joint.

The upper bearing point 13 of the McPherson strut 1 can be adapted to power steering as well as to manual steering; that is, the bearing must be adjusted such that a larger caster angle ε can be adjusted for power steering than in the case of manual steering.

The transverse control arm 2 as well as the bearing for the tension strut 3 have the same construction for the front axle and for the rear axle; so does the wheel carrier 6 with its bearings. Thus, the wheel carrier 6 with the transverse control arm 2 of the left front wheel can, at the same time, be used for the right rear wheel, and the use of the right front wheel with respect to the left rear wheel is to be carried out correspondingly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. Wheel suspension for a motor vehicle comprising:
   a wheel carrier for carrying a wheel rotatable about a wheel spin axis,
   a McPherson spring strut springingly supporting the wheel carrier at a vehicle body,
   a steering gear tie rod extending below the wheel spin axis and connected to the wheel carrier,
   a transverse control arm connected to the wheel carrier by a first joint connection and connected to a vehicle frame part by a second joint connection, and
   a tension strut connected pivotably to the transverse control arm by a third joint connection and to a vehicle frame part by a fourth joint connection,
   wherein the transverse control arm with the connected tension strut is arranged in an approximately horizontal plane and extends below the wheel spin axis approximately in a wheel center transverse plane, the tension strut extending at an angle diagonally with respect to a vehicle longitudinal center axis,
   wherein the transverse control arm is spaced longitudinally and vertically with respect to the tie rod and is disposed longitudinally behind the tie rod with respect to the vehicle forward driving direction, and
   wherein the third joint connection bearing allows a movement between the tension strut and the transverse control arm and has a softer characteristic in the radial direction than the second joint connection bearing.

2. Wheel suspension according to claim 1, wherein the transverse control arm and the tension strut are held on a vehicle subframe by respective elastic bearings forming the second and fourth joint connections, wherein the fourth joint connection bearing of the tension strut is an upright bearing which has radial recesses in its main loading directions set at an angle with respect to the vehicle longitudinal center axis and being softer in these directions than in the loading directions extending transversely thereto, and wherein the second joint connection is a horizontal bearing having a stiffer construction in the loading directions of the control arm than the upright bearing of the tension strut.

3. Wheel suspension according to claim 2, wherein the tension strut extends in the vehicle forward driving direction at an acute angle with respect to the transverse control arm, the third joint connection bearing being arranged on the transverse control arm closer to the wheel carrier than to the second joint connection bearing on the subframe, and wherein the spacing of the second and fourth connection bearing on the subframe corresponds approximately to the length of the transverse control arm between its two bearings formed at the first and second joint connections.

4. Wheel suspension according to claim 2, wherein the tie rod and the transverse control arm—in a top view—are set with respect to one another at an acute angle in such a manner that a correcting pole is obtained on the interior side of a wheel carried by the wheel carrier.

5. Wheel suspension according to claim 4, wherein a steering axis is formed between a body-side bearing of the McPherson spring strut and the first joint connection bearing point of the transverse control arm on the wheel carrier, which steering axis has a point of intersection in the wheel contact plane outside the track width and—with respect to the forward driving direction—in front of the wheel center transverse plane, and crosses the wheel spin axis at the interior side of the wheel and has a lever arm to the perpendicular wheel center longitudinal plane.

6. Wheel suspension according to claim 5, wherein the second joint connection elastic bearing of the transverse control arm has such a characteristic in a loading direction transversely to the vehicle that, in the case of driving forces for achieving a wheel position change by way of the lever arm formed by the steering axis, an elastokinematic wheel position change can be adjusted in the toe-in direction with the transverse control arm being stressed with respect to tension and the tie rod being stressed with respect to pressure.

7. Wheel suspension according to claim 6, wherein the tie rod—in rear view—extends sloped at an angle from a pivotal connecting point on the steering gear to a wheel-carrier-side bearing toward the road and has a shorter construction with respect to the transverse control arm, and wherein the caster angle of the steering axis is reduced under the effect of at least one of braking forces and wheel load changes, and a wheel adjusting change can be set in the toe-in direction.

8. Wheel suspension according to claim 5, wherein the second and fourth joint connection bearings are designed such that, in the case of a positive disturbing-force lever arm formed by the steering axis, a wheel position change in the toe-in direction can be superimposed by a longitudinal springing as a result of the driving forces of a wheel position change in the toe-in direction, the fourth joint connection bearing being limited in its movement toward the front in its main loading direction.

9. Wheel suspension according to claim 7 wherein the second and fourth joint connection bearings are designed such that, in the case of a positive disturbing-force lever arm formed by the steering axis, a wheel position change in the toe-in direction can be superimposed by a longitudinal springing as a result of the driving forces of a wheel position change in the toe-in direction, the fourth joint connection bearing being limited in its movement toward the front in its main loading direction.

10. Wheel suspension according to claim 4, wherein, for achieving a longitudinal springing of the suspension, the body-side fourth joint connection bearing of the tension strut in the loading direction of the tension strut has a softer construction than the body-side second joint connection bearing of the transverse strut such that this second joint connection bearing forms a pivot of the transverse control arm and the correcting pole forms a swivel point for the wheel position change against the driving direction in the toe-out direction.

11. Wheel suspension according to claim 5, wherein, for achieving a longitudinal springing of the suspension, the body-side fourth joint connection bearing of the tension strut in the loading direction of the tension strut has a softer construction than the body-side second joint connection bearing of the transverse strut such that this second joint connection bearing forms a pivot of the transverse control arm and the correcting pole forms a swivel point for the wheel position change against the driving direction in the toe-out direction.

12. Wheel suspension according to claim 9, wherein, for achieving a longitudinal springing of the suspension, the body-side fourth joint connection bearing of the tension strut in the loading direction of the tension strut has a softer construction than the body-side second joint connection bearing of the transverse strut such that this second joint connection bearing forms a pivot of the transverse control arm and the correcting pole forms a swivel point for the wheel position change against the driving direction in the toe-out direction.

13. Wheel suspension according to claim 2 wherein the caster angle of the steering axis can be changed corresponding to the use of power steering or of manual steering, a body-side upper bearing point of the spring strut being displaceable in the driving direction and, in the case of power steering, a larger caster angle being adjustable than in the case of a manual steering.

14. Wheel suspension according to claim 2, comprising a plurality of similar said wheel suspensions for the vehicle, including for at least one front and one rear axle, and wherein the respective transverse control arms, wheel carriers, tension struts joint connection bearings on the transverse control arms and the tension struts for the front and rear axle of a vehicle have the same shape and dimensions and can be used as respective equal interchangeable parts.

15. Wheel suspension according to claim 2, wherein the fourth joint connection bearing is arranged with radial recesses and the tension strut is held by way of a ball joint on the vehicle body.

16. Wheel suspension according to claim 1, wherein the tension strut includes a forked end portion engaging over the third joint connection 17. Wheel suspension according to claim 1, wherein the tie rod and the transverse control arm—in a top view—are set with respect to one another at an acute angle in such a manner that a correcting pole is obtained on the interior side of a wheel carried by the wheel carrier.

18. Wheel suspension according to claim 1, wherein the caster angle of the steering axis can be changed corresponding to the use of power steering or of manual steering, a body-side upper bearing point of the spring strut being displaceable in the driving direction and, in the case of power steering, a larger caster angle being adjustable than in the case of a manual steering.

19. Wheel suspension according to claim 1, comprising a plurality of wheel suspensions for the vehicle, including for at least one front and one rear axle, and wherein the transverse control arms, the wheel carriers and the tension struts as well as joint connections on the transverse control arms, respectively, have the same shape and dimensions and can be used as respective equal interchangeable parts.

20. Wheel suspension according to claim 2, comprising a plurality of wheel suspensions for the vehicle, including for at least one front and one rear axle, and wherein the transverse control arms, the wheel carriers and the tension struts as well as joint connections on the transverse control arms, respectively, have the same shape and dimensions and can be used as respective equal interchangeable parts.

21. Wheel suspension according to claim 1, wherein the fourth joint connection is arranged with radial recesses and the tension strut is held by way of a ball joint on the vehicle body.

* * * * *